Oct. 19, 1943.  M. D. RIGTERINK  2,332,343
CERAMIC MATERIAL
Filed Jan. 31, 1941  2 Sheets-Sheet 2

INVENTOR
M. D. RIGTERINK
BY
B.B. Jackson
ATTORNEY

Patented Oct. 19, 1943

2,332,343

UNITED STATES PATENT OFFICE 2,332,343

CERAMIC MATERIAL

Merle D. Rigterink, Forest Hills, N. Y., assignor to Bell Telephone Laboratories, Incorporated, New York, N. Y., a corporation of New York Application January 31, 1941, Serial No. 376,735

19 Claims. (Cl. 106—46)

This invention relates to ceramic material, and more particularly to fired ceramic material possessing highly advantageous properties the constituents of which calculated as oxides comprise oxides of silicon, aluminum, boron if desired, and two or more oxides of the alkalin earth metals.

The ceramic material of the present invention is advantageously of the steatite type. The principal raw materials employed in preparing ceramic materials of the steatite type are the naturally occurring magnesium silicates, known as talc or speckstein in their more pure forms or as soapstone in their more impure forms. The theoretical formula for this naturally occurring mineral in its pure form is $3MgO-4SiO_2-H_2O$. Ceramics of the steatite type include those in which a mineral of the above formula is the principal ingredient, as contrasted to the porcelain types in which clay, silica, and feldspars are the principal ingredients.

While the ceramic material of the present invention has properties rendering it advantageous for employment for various purposes, it may be employed to good advantage for electrical insulation purposes since it may be produced to have high direct and alternating current resistance and good dielectric properties at high frequencies. Indeed, because it may be produced to have such properties at both low and high temperatures, the ceramic material of the present invention may be particularly advantageously employed in electrical insulators for use as supports for the elements inside of vacuum tubes.

Such use imposes very rigorous requirements on an insulating material. The material must have high resistance to direct currents even at substantial voltages. It must have a low dielectric loss when subjected to high frequency alternating currents, since alternating currents of a megacycle or higher are often employed with vacuum tubes. For low dielectric losses at high frequencies the material must have a low dielectric constant and a low loss angle, since the power loss in a dielectric material subjected to an alternating current of a given frequency is in proportion to the product of its loss angle and its dielectric constant. Reduction in dielectric loss may be obtained more readily by reducing the loss angle than by attempting to reduce the dielectric constant, which cannot be reduced below the square of the refractive index of the material.

The material must not only have such properties at low temperatures but should retain such sulators in vacuum tubes are often subjected during operation of the tubes to temperatures of from 300° C. to 700° C., and may even be subjected for short periods during manufacture to temperatures of as high as 1000° C.

Material for use in insulators employed in vacuum tubes, moreover, should be fairly strong to support tube elements, should be capable of being molded into intricate shapes, and should be capable of being manufactured to size within close limits. Preferably the material should be very dense and of low porosity or, on the other hand, quite porous, to minimize the possibility of entrapment therein of occluded gases or other foreign substances which might deleteriously affect the electrical characteristic of the material or the operation of the tube.

Fused quartz has heretofore been considered the ideal dielectric of the inorganic type, since it has a low dielectric constant and low dielectric losses at high frequencies. However, it is very difficult to fabricate into the complicated shapes necessary for vacuum tube and other insulators, and at temperatures in the neighborhood of 400° C. or above its dielectric losses increase substantially.

Because of these disadvantages of quartz it has been proposed to employ steatite type ceramics for insulating purposes since they may be more readily formed into intricate shapes than quartz and since their electrical properties do not change deleteriously with a rise in temperatures to an extent as great as those of quartz. However, the dielectric losses of such materials heretofore employed have in general been greater than desirable and, as far as is known, higher than those of quartz.

The ceramic material of the present invention may be readily formed into intricate shapes, either by molding or by machining operations, the latter being preferably performed before the material is finally fired. The material may be made so that it is heat resistant and possesses at both low and high temperatures dielectric properties, including high direct and alternating current resistances over a wide range of currents and voltages, approaching or even surpassing those of quartz. It may readily be made as dense or as porous as is desired.

The composition and characteristics of ceramic material embodying the invention will be discussed in connection with the accompanying drawings, in which.

Figure 1:
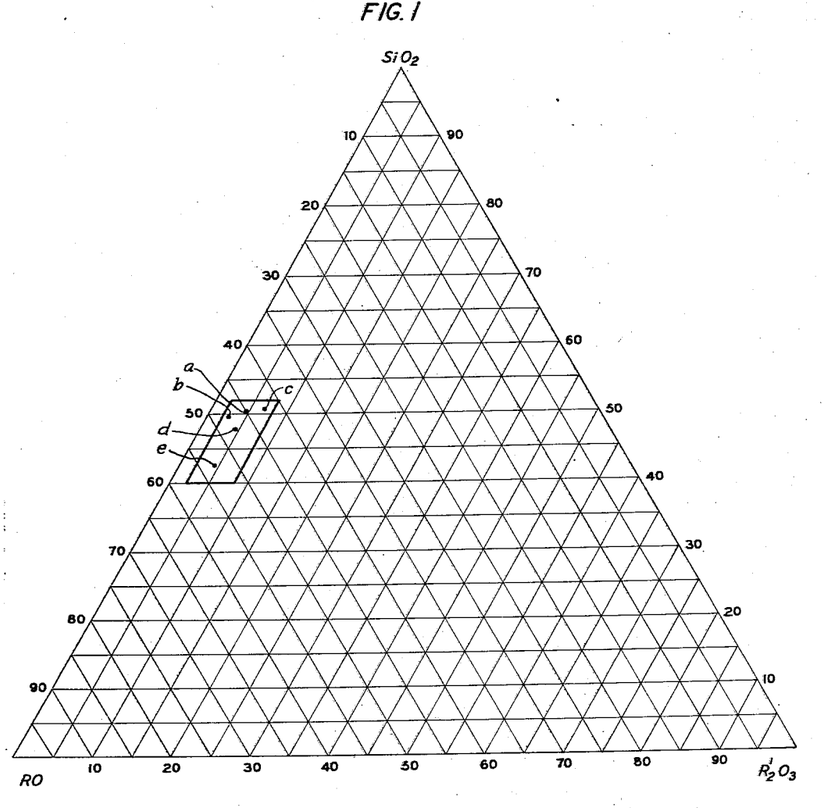
Fig. 1 is a triaxial diagram indicating the com-

The ceramic material of the present invention comprises constituents which, when calculated as oxides, fall within the region bounded by the parallelogram indicated on the triaxial diagram of Fig. 1. This diagram is an $SiO_2$, $R'_2O_3$, RO diagram in which $R'_2O_3$ represents aluminum oxide, $Al_2O_3$, or aluminum oxide and a minor proportion of boron oxide, $B_2O_3$, and in which RO represents the sum of at least two oxides of the alkalin earth metals, e. g., magnesium oxide, MgO; barium oxide, BaO; calcium oxide, CaO; strontium oxide, SrO; and beryllium oxide, BeO.

The triaxial diagram differs from those usually employed to represent ceramic compositions in that it indicates mol per cents of the constituents rather than percentages by weight.

To determine the mol percentages of the oxide constituents of a given ceramic material, the percentage by weight of each constituent, such as $SiO_2$, $Al_2O_3$, MgO, BaO, CaO, SrO, or BeO is divided by the molecular weight of the constituent, thus providing a quotient number for each constituent. The resulting quotient numbers are added together and the mol per cent of each constituent is obtained by dividing the quotient number for said constituent by the sum of the quotient numbers and multiplying by 100.

Thus the ceramic material of the present invention comprises from about 40 to about 52 mol per cent of $SiO_2$, from about 2 to about 8 mol per cent of $R'_2O_3$ and a remainder comprising two or more of the oxides MgO, BaO, CaO, SrO and BeO.

The ceramic material may also contain small amounts of ferric oxide, ferrous oxide, sodium oxide, potassium oxide, titanium dioxide, or other substances, or compounds of such metals expressible as such oxides, usually on the order of 1 per cent or less by weight, which substances may occur from the presence of such substances as impurities in the raw materials, such as talc or kaolin, from which the ceramic material is made. To render the ceramic material particularly advantageous for electrical insulating purposes and particularly for vacuum tube insulating purposes, the material advantageously is formed of raw materials of high purity, which contain little or no alkali metals or oxides thereof. This may be achieved by selection of raw materials of high purity having a low or preferably no alkali content, or by purification of raw materials to remove the alkali impurities completely or to as great an extent as possible. It has been found that the presence of as little as $\frac{1}{10}$ of 1 percent of the oxide of one or more alkali metals will cause a noticeable change in the electrical properties of the material; an alkali content of more than about .5 per cent calculated as the oxide of the ceramic material should be avoided since it will harmfully affect the electrical properties of the material. It appears that the alkali metals cause the formation in the ceramic material of glasses having unfavorable dielectric properties, particularly at elevated temperatures. Iron oxides, while undesirable, are not as harmful as alkali oxides. The small amounts of such other substances which may be present in the ceramic material of the present invention are included in the RO and $R'_2O_3$ oxides of the triaxial diagram.

The employment, according to the present invention, of two or more alkalin earth oxides as fluxes in a ceramic material of a composition falling within the area indicated on the triaxial diagram provides advantageous results which in general cannot be provided by an equivalent amount of one alkalin earth oxide flux alone. For example, by combining barium oxide and magnesium oxide or materials which on firing will produce such oxides, as well as other constituents in proportions contemplated by the present invention, it is possible to produce a ceramic material having a dielectric loss only one-fifth as great as the dielectric loss of the best ceramic material that it has been found possible to produce employing magnesium oxide alone as a flux. Likewise such ceramic material embodying both magnesium and barium oxide has a lower dielectric loss than one embodying barium oxide alone as a flux. The dielectric and electrical resistance properties at elevated temperatures of a barium oxide-magnesium oxide ceramic material embodying the present invention are also better than those of ceramic materials embodying barium oxide alone or magnesium oxide alone.

Similarly a ceramic material of the composition contemplated by the present invention embodying calcium oxide as well as magnesium oxide has better dielectric and resistance properties, particularly at elevated temperatures, than a ceramic material embodying an equivalent amount of either calcium oxide alone or magnesium oxide alone.

The same holds true for magnesium oxide-strontium oxide ceramic materials embodying the present invention, as compared with ceramic materials embodying strontium oxide alone or magnesium oxide alone. Magnesium oxide-strontium oxide ceramic materials embodying the present invention, however, do not appear to have as good dielectric properties as do certain other ceramic materials of the present invention embodying two or more alkalin earth oxides, but they do have excellent dielectric properties at lower temperatures, as well as other characteristics rendering them highly advantageous. For example, such ceramic materials will sustain a forced vibration much more readily and with less damping than single oxide materials and hence may be advantageously employed for purposes in which the properties of good electrical insulation and low dissipation of forced vibration are important.

A beryllium oxide-magnesium oxide ceramic material having a composition falling within the area indicated on the triaxial diagram has a direct current resistance much greater, even as much as one hundred times greater, than a ceramic material containing an equivalent amount of magnesium oxide alone as the flux, although the other dielectric properties of the magnesium oxide-beryllium oxide ceramic material may not be as good as those of a corresponding ceramic material employing magnesium oxide alone. A ceramic material of the type contemplated by the present invention embodying barium oxide as well as beryllium oxide as its alkalin earth oxide fluxing materials possess exceptionally good dielectric properties and exceptionally good direct current resistance, both at low and elevated temperatures.

In each case in which two or more alkalin earth oxides are employed in a ceramic material of the composition contemplated by the present invention, each alkalin earth oxide should be present in an amount great enough to be effective. It appears that at least 2 mol per cent of each alkalin earth oxide should be present in order to render the oxide effective in modifying the properties of the ceramic material. As little as 2 mol per cent of barium oxide, for example, exerts a marked effect in improving the dielectric properties and electrical resistance of a ceramic material the constituents of which fall within the ranges contemplated by the present invention.

The alkalin earth oxides employed as fluxes in the proportions contemplated by the present invention in general lower the temperature to which the ceramic material must be fired in order to obtain the desired structure and properties.

While aluminum oxide alone may be employed in forming the ceramic material of the present invention, in some cases the presence of boron oxide substituted for a portion of the aluminum oxide exerts a beneficial effect. All of the aluminum oxide, however, should not be replaced by boron oxide, since the maturing temperature of the resulting ceramic may in such a case be so greatly reduced that the temperatures necessary for the desired reactions between the other constituents may not be attained. In general, a minor part of the aluminum oxide may be replaced by boron oxide to improve the dielectric properties and direct current resistances.

It appears that when two alkalin earth oxides are employed in ceramic material of the present invention, formation is promoted of crystalline meta-silicates of alkalin earth metals of good electrical properties, as well as the formation of complex glasses including the alkalin earth metals also having desirable electrical properties. In cases where a great improvement in dielectric properties is provided by the employment of two alkalin earth oxides, such as barium oxide and another alkalin earth oxide, it is believed that such improvement is not only due to the presence of crystals of good dielectric properties, but is also due to the presence in the ceramic material of one or more complex glasses of good dielectric properties.

The region indicated in the triaxial diagram of the drawings as including the compositions of the ceramic material embraced by the present invention is quite critical. Silica in excess of the maximum amount indicated is very detrimental since it seriously impairs the dielectric properties of the ceramic material. RO in excess of the amount indicated as a maximum is also detrimental in these respects. If the $R'_2O_3$ content is increased to an amount larger than that indicated as the maximum, as by decreasing the talc-to-kaolin ratio if these be employed as raw materials, the ratio of the crystal to the glass in the ceramic material decreases, with a decrease in the direct current resistance and increase in the dielectric loss of the ceramic material. If the $R'_2O_3$ content is decreased below the minimum amount indicated, as by increasing the talc-to-rials, the crystal-to-glass ratio in the ceramic is increased. Under such conditions although the dielectric properties of the material may be improved slightly, the direct current resistance appears to decrease, the firing range is considerably shortened, and the ceramic materials become more brittle and have other undesirable physical properties.

Advantageous properties, particularly from the electrical insulation standpoint, are provided where the ceramic material includes two or more alkalin earth oxides, or compounds expressible as oxide, of which one is magnesium oxide in an amount at least as great as 25 mol per cent of the ceramic material composition, the $SiO_2$ and $R'_2O_3$ being within the ranges contemplated by the invention. When at least this amount of magnesium oxide is employed, it is possible to employ talc and a clay, such as kaolin, as the primary raw materials, which is advantageous both from an economic and a manufacturing standpoint. This amount of magnesium oxide is about the smallest amount which can be employed in a steatite type ceramic material formed of talc and clay and having oxide constituents falling within the ranges contemplated by the present invention. Moreover, when this amount of magnesium oxide is employed in the RO, particularly when the remainder of the RO is predominantly barium oxide, exceptionally good electrical insulation results are provided.

Ceramic material embodying the present invention is in general predominantly crystalline in structure although containing a substantial portion of glass, in general from about 15 per cent to about 45 per cent by volume. The glass, which, as indicated above, may be a complex glass containing two or more alkalin earth metal compounds provides strength by cementing together the crystalline portions of the material. Where the RO contains a predominant proportion of magnesium oxide and smaller proportions of one or more other alkalin earth oxides, the crystalline phase is primarily magnesium meta-silicate, preferably of the meso-enstatite type. In such case the small meso-enstatite crystals constituting the major portion of the structure of the ceramic material play a large part in providing good electrical insulation properties.

The ceramic material advantageously and readily may be made of a dense, substantially non-porous structure, which is advantageous for most uses. Thus when employed in vacuum tubes such structure minimizes the possibility of the presence in the material of adsorbed or occluded gases or other substances which might impair the operation of the tube as indicated above, and in other cases it reduces the possibility of moisture absorption by the material and consequent electrical losses. However, it is possible to provide a porous structure, if desired, as by incorporating in the raw materials during mixing a substantial amount of an organic substance which on firing is burned out and leaves a porous ceramic structure.

A rough surface which is advantageous for certain uses, as when coatings are applied on the ceramic material may be readily produced on the material, even though it is non-porous. This may readily be accomplished by employing in the several raw materials used in making the ceramic materials one or more calcined raw materials, such as calcined metallic oxides. During the firing of the ceramic material, the hard particles identity to an appreciable extent and thus provide the desired rough surface.

While the ceramic material of the present invention may be formed by the mixing and firing of various kinds of raw materials, even by the mixing of oxides, or carbonates or other compounds which on firing will form the oxides indicated on the triaxial diagram in the proper proportions, it is advantageous, particularly for economic reasons, to prepare the ceramic material of the present invention to as great an extent as possible from naturally occurring raw materials. Thus, the ceramic material may be prepared from naturally occurring raw materials such as talc, clay or kaolin, and naturally occurring or artificially prepared alkalin earth oxides or compounds which will form oxides on firing, such as the alkalin earth metal carbonates, sulphates, phosphates, etc. The materials should be of high purity, particular care being taken to insure as high a degree of freedom as possible from alkali metal compounds for the reasons indicated above. It is preferable from the economic standpoint that the raw materials be of naturally high purity, although they may, if necessary, be purified by artificial means. It is further desirable that during the handling, mixing and firing of the mixed raw materials precautions be taken that no undesirable impurities are introduced. If a mixing treatment involving the use of water is employed, it may be desirable to add at least some alkalin earth metals in the form of carbonates which will not react with water rather than in the form of oxides which will react with water to form hydroxides.

Moreover, it is advantageous to employ pure water for mixing purposes to insure that no impurities are present in the water which might detrimentally affect the properties of the ceramic material or precipitate substances out of the mixture of ceramic materials and thus impair the desired homogeneity of the mixture.

The mixing of the raw materials should be performed under conditions such that an intimate and very homogeneous mixture of the materials is provided. Otherwise the resulting ceramic may be of non-uniform composition and hence have portions therein of inferior insulation or dielectric properties. In preparing the ceramic from raw materials such as talc, kaolin and alkalin earth carbonates, it is advantageous to place the proper portions of the talc, kaolin and alkalin earth carbonates in finely divided form in a rubber lined ball-mill drum with enough distilled water to form a thick slip. Good results are obtained when the raw materials and the balls in the drum, which may advantageously be sillimanite balls, fill approximately two-thirds of the drum, the volumes of the balls and the dry raw materials preferably being approximately equal. The drum should then be rotated for a long enough period to mix thoroughly and homogeneously the raw materials in the form of a thick slip. While rotation of the drum for a period of about four hours results in fairly satisfactory mixing, it has been found advantageous, for example, to rotate the drum for about twenty hours at about 60 R. P. M. since a more homogeneous mixture is thus provided. The longer mixing period also results in grinding of the raw materials to an extremely finely divided form, which is advantageous in that it promotes homogeneity and reactivity of the ingredients in firing. An alternative mixing procedure may be employed involving first mixing the raw materials with distilled water in a baker's type double motion paddle mixer and then circulating the mixture through a colloid mill for a suitable period of time. Ceramic materials molded and fired from mixtures formed in this manner, although satisfactory, in general do not have electrical properties quite as good as those resulting from ball-mill mixing.

Dry mixing of the raw materials in a ball mill of the above type may also be performed satisfactorily. Dry mixing of the materials in the usual type of ceramic mixer comprising a rotatable vertical shaft carrying rollers and plows to mix the dry materials carried in a stationary pan may also be employed, although it does not appear to provide as homogeneous a mixture as does wet mixing by either of the methods indicated above or dry mixing in a ball mill. Ceramic materials fired from raw materials dry mixed in this manner do not in general have electrical properties as desirable as those mixed by the other indicated methods.

While shaped bodies of the ceramic materials of the present invention can be formed in the desired shapes by casting or extrusion, they may advantageously be formed by molding of dry or only slightly moist mixed raw materials according to the dry-press process, after which the bodies may be fired. Such molding process is particularly advantageous for producing accurately shaped pieces.

The ceramic material of the present invention generally shrinks appreciably during the firing operation, usually about 10 to 15 per cent in the direction normal to the direction of applied pressure in the mold and from 3 to 5 per cent more in a direction parallel to that of the applied pressure in the mold, depending largely upon the pressure employed. Therefore, when the material is cast, molded or extruded to shape, allowance should be made in the design of the dies for shrinkage of the material, so that the desired final size and shape of the article formed of the material is obtained. By proper choice of pure, identical raw materials and by following identical manufacture procedures, a high degree of reproducibility is obtained. That is, ceramic articles may be readily produced having practically identical characteristics, sizes and shapes.

When it is desired to press-mold the material which has been mixed by a method involving the preparation of a wet slip, the maner of dewatering the slip also affects to a certain extent the electrical properties of the resulting ceramic material. Thus, when the slip, after removal from the mixing mill, is partially dried to a thick paste while being mixed in a double motion paddle mixer and then completely dried by being heated on porous plates with intermediate screening, very satisfactory electrical properties are obtained in the fired ceramic material. Dewatering of the slip by filtering is also satisfactory, providing the filtering operation is performed in a short enough time so that stratification and hence heterogeneity of the mixture does not result. For example, filtering according to a laboratory procedure by means of a filter flask and the Büchner funnel using a hard filter paper, provides satisfactory results. However, dewatering of the slip by means of a centrifugal drier although having some advantages in general does not appear to provide results as satisfactory as the above-indicated procedures.

In some circumstances it may be advantageous to incorporate temporary binders in the mixture of raw materials. Thus, it is advantageous to include such a binder if the mixture is being cast in order to impart sufficient strength to the article to hold it together while it is being handled and fired. Again, it is advantageous to incorporate a temporary binder in the mixture to permit the article to be machined after it has been press-molded and prior to firing. As examples of temporary binders which may be employed for such purposes are dextrines, of which yellow potato dextrin appears to be exceptionally good. A binder formed of the residues extracted from wood in the sulphite process may also be advantageously employed, as may binders such as paraffin wax and the like. Up to 3 per cent of such a binder may be employed without appreciably increasing the porosity of the ceramic material. Larger proportions of such organic binders may, of course, be employed if it is desired to provide a porous ceramic material, since upon firing of the ceramic material such organic binders burn out.

The presence of such binders in the mixture of raw materials appears to reduce the pressure necessary in the press-molding operation, since the binder apparently aids the flow of the mixture of ceramic raw materials in the mold.

Other substances besides binders may be mixed with the raw materials to produce a porous material. Thus, wood flour, in amounts as great as 25 per cent or more by volume of the other raw materials, may be employed. Such substance also burns out of the ceramic material on firing, leaving a porous structure.

In the firing of ceramic material of the kind to which the present invention is directed, the heat treatment employed determines to a considerable extent the physical and other properties of the finished material. It has a pronounced effect on the micro-structure and electrical properties. The heat treatment is, of course, governed to a large extent by the size and shape of the cross-section of the articles being fired. Furthermore, it is apparent that from the cost viewpoint, the most economical firing temperature is the shortest one which will make possible the desired properties of the material.

During the firing operation, which is such that vitrification occurs, numerous fusions, reactions, inversions, and crystallizations occur, and the firing temperature, heating and cooling times should be such as to permit such actions to take place to the extent desired to provide the desired properties. The maximum or maturing firing temperature should not be so high that the article formed of the raw materials becomes overfired, as is evidenced by the formations of blebs and considerable distortion or warping, although a certain amount of shrinkage necessarily occurs. It should not be too low, or else the desired reactions and changes will not occur, or will not occur to the desired extent.

It is advantageous to employ a maturing temperature of about 5° C. below the temperature at which blebs begin to form, to provide a dense, non-porous material of good alternating and direct current insulating properties. A lower temperature, to as low as 50° C. or 60° C. below the melting temperature may be employed without substantially decreasing the desirable insulating properties, but with an increase in the porosity of the ceramic material. In general, maturing temperatures lying between 1100° and 1300° C. are employed in firing the ceramic materials of the invention.

In firing to virtification ceramic material embodying the present invention, almost all shrinkage of the material occurs in the vicinity of the maturing firing temperature. The amount of shrinkage which occurs also varies substantially at different temperatures within the vicinity of the maturing temperature, the amount of such shrinkage increasing substantially for a small increase in temperature. In order closely to control the sizes of finished articles embodying a ceramic material of the invention, and in order to obtain identical properties in all articles formed of the same material, the maturing temperature should be controlled within close limits. Advantageous results in these respects are obtained when the actual maturing firing temperature is held to within about plus or minus 5° C. of the desired maturing firing temperature.

Very rapid heating and cooling, which allow insufficient time for the numerous fusions, reactions, inversions, and crystallizations to reach equilibrium, have detrimental effects upon the properties, and particularly upon the electrical properties. Slower heating, holding at the maximum temperature for a substantial period, and slow cooling provide better electrical properties. Slow cooling, apparently because it promotes crystallization, particularly aids in the production of a material of good dielectric properties. Holding at the maximum temperature for a long period promotes the formation of glass and decreases the porosity of the ceramic materials.

A comparatively short firing schedule may be employed in firing the ceramic materials of the present invention with good results as far as the physical and electrical properties are concerned. This is apparently due to the employment of fine raw materials and resultant greater reactivity thereof.

For ceramic materials of the present invention of cross-sections on the order of those found in vacuum tube insulators, i. e., approximately one-fourth inch or less in thickness, a firing schedule has been found advantageous in which approximately six hours is taken to reach the maturing temperature, then a soak at said temperature for an hour or an hour and a half, followed by a slow cooling for from six to eighteen hours, as is provided when the material is left in the furnace after heating thereof has been discontinued.

Bodies, such as insulators, of ceramic material of the present invention may be machined to shape, if desired, instead of being molded, as by press-molding, casting or extrusion. The machining advantageously is performed before final firing and vitrification of the ceramic material since the unfired material is more easily machinable than the fired material. As indicated above, a small amount of a suitable binder may be incorporated in the mixed raw materials which may be formed into a body which upon drying has sufficient strength to be handled and machined. Alternatively, the mixed raw materials, with or without a binder, may be prefired to a temperature substantially below the maturing temperature after which, on cooling, they are coherent enough to be machined.

For the purposes of illustration the composition, method of manufacture and electrical properties of several ceramic materials of the present invention will be indicated. In each of these cases the ceramic material is formed into a disc about 2½ inches in diameter and from .075 inch to .1 inch in thickness. For the electrical measurements, such as for the resistances and dielectric properties, silver electrodes are applied to the opposite surfaces of each disc by means of silver paste. To accomplish this, a paste containing a suspension of silver in an organic binder is applied to opposite faces of the disc, which is then heated to burn out the organic binder and leave on each side of the disc a residue of metallic silver with which electrical contact can be made.

The values for direct current resistances are measured at 100 volts by the direct deflection galvanometer method described at page 194 of Law's "Electrical Measurements," McGraw-Hill Book Co., Inc., New York, New York, 1938. The dielectric properties of the material when subjected to alternating current are determined according to methods and apparatus of the type described by Thurnauer and Badger in the Journal of the American Ceramic Society, pages 9–12, January, 1940. The magnitude of the dielectric loss is indicated by the values of "Q" determined by this method; that is, the higher value of Q, the less the energy lost as heat in the dielectric. The term "Q" designates the ratio of reactance to resistance or susceptance to conductance of the ceramic article. In the case of articles of the type tested, which may be represented by a loss free capacitance shunted by a conductance G, $$Q = \frac{\omega C}{G} = \frac{1}{\tan \delta}$$

where $G$ = equivalent parallel conductance of the test piece,
$C$ = the equivalent parallel capacitance,
$\omega = 2\Pi X$ frequency, and
$\tan \delta$ = tangent of the loss angle of the ceramic material.

The resistance and dielectric loss measurements at elevated temperatures are made while the test piece is heated to the desired temperature in a small furnace. The measurements are believed to be relatively accurate to within 10 per cent plus or minus.

The dielectric constants of the ceramic materials described below, although not individually noted below, are between 7 to 8.5.

*Example 1*

On a weight basis, 80 parts (60 per cent) of a California talc, 20 parts (15 per cent) of a Florida plastic kaolin, 10 parts (7.5 per cent) of chemically pure magnesium carbonate and 23.4 parts (17.5 per cent) of chemically pure barium carbonate are mixed to form the material from which the ceramic materials is fired.

The theoretical analysis for talc,

3MgO—4SiO₂—H₂O and the typical analysis of the California talc employed, are in percentages by weight:

|  | Theoretical | Actual |
| --- | --- | --- |
| SiO₂ | 63.5 | 60.8 |
| MgO | 31.7 | 31.1 |
| Al₂O₃ |  | 1.6 |
| Fe₂O₃ |  | 0.8 |
| CaO |  | 1.2 |
| Alkalis |  |  |
| Loss on ignition | 4.8 | 4.4 |

The theoretical analysis for kaolin,

Al₂O₃—2SiO₂—2H₂O and the typical analysis of the Florida kaolin employed are in percentages by weight:

|  | Theoretical | Actual |
| --- | --- | --- |
| SiO₂ | 46.5 | 47.0 |
| Al₂O₃ | 39.5 | 36.8 |
| Fe₂O₃ |  | 0.8 |
| CaO |  | 0.15 |
| MgO |  | 0.2 |
| TiO₂ |  | 0.18 |
| Alkalis |  | 0.24 |
| Loss on ignition | 14.0 | 15.0 |

The raw materials in the above-indicated proportions, preferably in finely divided form, are placed in a rubber-lined ball-mill drum containing sillimanite balls. For good mixing, the raw materials and balls should fill the drum approximately two-thirds full. Enough distilled water is added to form a thick slip. The drum is rotated for about twenty hours, after which the slip is removed and placed in a double motion paddle mixer, in which the slip is mixed while heat is applied thereto until it dries into a thick paste. The paste is then dried further by being heated on porous plates, until it can be forced through a 10-mesh screen with very little deformation of the material. After passing through this screen, it is alternately dried and forced through 20- and 40-mesh screens.

The powder of 40-mesh is then processed so as to bring it to approximately 5 per cent moisture content. Discs approximately 2½ inches in diameter and from .075 to .1 inch in thickness are pressed from the powder in a steel mold at a pressure of about 8 tons per square inch. Pressure on the samples is advantageously momentarily released at pressures of about .4, 2 and 4 tons per square inch, such "breathing" of the samples being helpful in preventing the formation of laminations in the pressed discs.

The discs are then fired in a gas fired ceramic kiln according to a firing schedule in which approximately six hours are taken to reach the maturing temperature between 1100° C and 1300° C. and which advantageously is about 1250° C. The discs are held at the maturing temperature for an hour to an hour and a half, after which they are allowed to cool slowly for six to twelve hours or more, as by permitting the discs to cool overnight in the furnace which has been turned off.

The constituents of the finished ceramic material calculated as oxides correspond to a mol per cent composition of 38.2 mol per cent MgO, 6.1 mol per cent BaO, and .9 mol per cent of CaO, a total of 45.2 mol per cent RO; 4.5 mol per cent of Al₂O₃ and .3 mol per cent of Fe₂O₃, a total of 4.8 mol per cent R'₂O₃; and 50 mol per cent of SiO₂. This composition is represented approximately by the point $a$ on the triaxial diagram of Fig. 1.

The discs are hard, dense, and strong. They are predominantly crystalline in character, although they contain substantial amounts of glass which serve to cement the crystalline phases in the material. The crystals are very small and X-ray examination of their lattice structure reveals that they are predominantly meso-enstatite. Testing of the ceramic discs at elevated temperatures for direct current resistance and dielectric loss according to the methods indicated above provides the following data:

Specific resistance in ohm cm.
350° C ----------------------------- $2.5 \times 10^{12}$
450° C ----------------------------- $1.1 \times 10^{11}$
550° C ----------------------------- $1.0 \times 10^{10}$

|  | Values of Q at— | |
|---|---|---|
|  | 350° C. | 450° C. |
| 100 kc | 700 | 130 |
| 300 kc | 850 | 203 |
| 800 kc | 870 |  |
| 1,000 kc |  | 286 |
| 3,000 kc | 1,080 |  |

Example 2

In this example the same proportions of talc, kaolin, chemically pure magnesium carbonate and chemically pure barium carbonate are employed as in Example 1. The kaolin is the same as that in Example 1; however, a slightly purer talc, a Manchurian talc, is employed having the following composition by weight: 61.2 per cent of $SiO_2$; 30.4 per cent of MgO; 1.4 per cent of $Al_2O_3 + Fe_2O_3$; 0.9 per cent of CaO; alkalis, none. The example also indicates a procedure involving the employment of a temporary binder.

The raw materials are mixed as in Example 1, but the slip is dewatered by means of a Büchner funnel, filter flask and a hard filter paper. The resulting filter cake is dried to complete dryness in an oven or on a hot plate. A binder comprising about 3 per cent by weight of yellow potato dextrin is added to the dry mixture which is rotated in the ball mill for about a half hour, after which about 4 per cent of water is added and the mixture rotated in the mill for one-half hour longer. The mixture is then pressed through 10, 20, and 40-mesh screens, after which it is molded. The molding is advantageously performed at a pressure of 4 tons per square inch, since the dextrin aids the flow of the material in the mold, although it is desirable momentarily to release the pressure in stages to prevent lamination of the material.

After air drying or heat drying to about 100° C., the resulting material is sufficiently strong to be machined if desired. The material is then fired in the manner indicated in Example 1 to a temperature of about 1245° C. The resulting ceramic material has a composition, expressed in mol per cents of oxides and indicated approximately by point $a$ in the triaxial diagram of Fig. 1, of approximately 37.9 mol per cent of MgO, 6.2 mol per cent of BaO, and 0.7 mol per cent of CaO, a total of 44.8 mol per cent of RO; 4.5 mol per cent of $R'_2O_3$, comprising $Al_2O_3$ and $Fe_2O_3$; and 50.7 mol per cent of $SiO_2$. The physical characteristics are similar to those of the material prepared according to the procedure of Example 1, since the binder, which is burned out in the firing, is originally present in such a small amount that it does not appreciably increase the porosity of the material. Probably because the talc employed in this example is slightly more pure than that employed in the preceding example, the resistance and dielectric loss measurements are somewhat better:

Specific resistance in ohm cm.
350° C ----------------------------- $1.5 \times 10^{13}$
450° C ----------------------------- $4 \times 10^{11}$
550° C ----------------------------- $2.7 \times 10^{10}$ Values of Q at 450° C.
100 kc ----------------------------- 227
300 kc ----------------------------- 308
1000 kc ---------------------------- 367

Example 3

The proportions of talc, kaolin and magnesium and barium carbonates in this example are the same as those of the first example. All the constituents except the talc are also the same. The talc, however, is another California talc having the following composition by weight: 63.3 per cent of $SiO_2$; 31.0 per cent of MgO; 0.9 per cent of $Al_2O_3$; 0.6 per cent of $Fe_2O_3$; 0.6 per cent of CaO; 0.15 per cent of alkalis; 3.2 per cent loss on ignition.

These raw materials are mixed, molded and fired according to the procedure outlined in Example 1, the firing temperature being about 1230° C. The completed ceramic material has the following mol per cent composition, the metals being calculated as oxides: 38.3 mol per cent of MgO, 6.0 mol per cent of BaO, and .7 mol per cent of CaO, a total of 45.0 mol per cent RO; 4.1 mol per cent of $Al_2O_3$ and 0.2 mol per cent of $Fe_2O_3$, a total of 4.3 mol per cent of $R'_2O_3$; and 50.7 mol per cent of $SiO_2$. This composition corresponds approximately to point $a$ on the triaxial diagram of Fig. 1.

The physical characteristics of the ceramic material of this example are practically identical with those of the ceramic material of Example 1. The direct current resistance and dielectric loss characteristics determined by the methods indicated above are as follows:

Specific resistance in ohm cm.
350° C ----------------------------- $3.5 \times 10^{12}$
450° C ----------------------------- $1.3 \times 10^{11}$
550° C ----------------------------- $1.0 \times 10^{10}$ Values of Q at 450° C.
100 kc ----------------------------- 167
300 kc ----------------------------- 227
1000 kc ---------------------------- 315

Example 4

In this example a different talc is employed, all other constituents being the same as in Example 1. The analysis for said talc is as follows, the percentages being by weight: 55.5 per cent of $SiO_2$; 34.1 per cent of MgO; 3.6 per cent of $Al_2O_3$; 0.1 per cent of $Fe_2O_3$; 0.7 per cent of CaO; alkalis, none; and 5.8 per cent loss on ignition.

Because of the high $MgO-SiO_2$ ratio of this talc no magnesium carbonate is employed in the flux. A mixture having the following proportions by weight is employed: 84 parts (68.8 per cent) talc; 16 parts (13.1 per cent) of kaolin; and 22 parts (18.1 per cent) of chemically pure barium carbonate.

The constituents are mixed, dewatered, molded and fired in the manner indicated in Example 1, the firing temperature employed being about 1220° C. The resulting ceramic material has a composition in which the constituents calculated as oxides of the metals are of the following mol percentages: 38.9 mol per cent of MgO, 6.2 mol per cent of BaO, 0.6 mol per cent of CaO, a total of 45.7 mol per cent of RO; 4.8 per cent of $R'_2O_3$ (substantially all $Al_2O_3$); and 49.5 mol per cent of $SiO_2$. The composition of this ceramic material is indicated approximately by the point $a$ on the triaxial diagram in the drawings.

The physical characteristics of this ceramic material are similar to those of the material described in Example 1. The direct current resistance and dielectric loss characteristics, determined as indicated above, are:

Specific resistance in ohm cm.
350° C_________________________ $6 \times 10^{11}$
450° C_________________________ $3 \times 10^{10}$
550° C_________________________ $2.8 \times 10^{9}$ Values of Q at 450° C.
100 kc_________________________ 115
300 kc_________________________ 163
1000 kc________________________ 205

*Example 5*

That other raw materials besides talc and kaolin may be employed is indicated by this example in which a mineral known as halloysite-hydrohalloysite having the theoretical formula $Al_2O_3$—$2SiO_2$—$nH_2O$ is employed instead of the kaolin. All other raw materials are the same as those of Example 1. Percentage by weight composition of the halloysite-hydrohalloysite employed is 38.9 per cent of $SiO_2$; 39.7 per cent of $Al_2O_3$; 0.52 per cent of $Fe_2O_3$; 0.4 per cent of CaO; 0.08 per cent of MgO; 0.05 per cent of $TiO_2$, 0.14 per cent alkalis; and 20.4 per cent loss on ignition.

The raw materials are mixed in the following proportions: 80 parts (60.8 per cent) of talc; 20 parts (15.2 per cent) of halloysite-hydrohalloysite; 9 parts (6.8 per cent) of magnesium carbonate; and 22.5 parts (17.2 per cent) of barium carbonate.

The raw materials are mixed, dewatered, molded, and fired according to the procedure indicated for Example 2, the firing temperature employed being approximately 1250° C. The final ceramic material has a composition calculated as mol per cents of oxides of the metal constituents of 38.3 mol per cent MgO, 6.0 mol per cent of BaO, and 1.1 mol per cent of CaO, a total of 45.4 mol per cent of RO; 4.8 mol per cent of $Al_2O_3$ and 0.2 mol per cent of $Fe_2O_3$, a total of 5.0 per cent of $R'_2O_3$; and 49.6 mol per cent of $SiO_2$. The point $a$ on the triaxial diagram of Fig. 1 approximately indicates the composition of this material.

Physically the structure of the fired ceramic material is similar to the material of Example 1. The direct current resistance and dielectric loss characteristics at elevated temperatures determined according to the methods indicated above are:

Specific resistance in ohm cm.
350° C_________________________ $2.0 \times 10^{12}$
450° C_________________________ $1.0 \times 10^{11}$
550° C_________________________ $9 \times 10^{9}$ Values of Q at 450° C.
100 kc_________________________ 97
300 kc_________________________ 153
1000 kc________________________ 216

*Example 6*

This example also indicates that ceramic material embodying the present invention may be made from raw materials other than talc and clays. In this example silicic acid, having the formula $SiO_2.nH_2O$ and containing about 26.7 per cent by weight of water, aluminum hydroxide, having the formula $Al_2O_3.nH_2O$ and containing about 34.4 per cent of water and magnesium and barium carbonates are the raw materials. In making the ceramic material 68.2 parts by weight (43.9 per cent) of said silicic acid, 12.3 parts by weight (7.9 per cent) of aluminum hydroxide 54.8 parts by weight (35.3 per cent) of magnesium carbonate and 20.1 parts by weight (12.9 per cent) of barium carbonate are mixed together, molded, and fired according to the procedure indicated in Example 2. The firing cycle described in Example 2 is employed in this case, the ceramic material being heated to a maturing temperature of about 1240° C.

The resulting ceramic material is very white, translucent, dense and of substantial strength. It is predominantly crystalline in structure, although it contains a substantial portion of glass cementing the crystals together.

The mol per cent composition of the material calculated as oxides, is approximately 39.1 mol per cent of MgO and 6.1 mol per cent of BaO, a total of 45.2 mol per cent of RO; 4.8 mol per cent of $Al_2O_3$ ($R'_2O_3$); and 50.0 mol per cent of $SiO_2$. This composition is approximately indicated by point $a$ of the triaxial diagram of Fig. 1.

The direct current resistance properties at elevated temperatures of this ceramic material are indicated by the following data, which was obtained according to the method described above:

Specific resistance in ohm cm.
350° C_________________________ $2.7 \times 10^{11}$
450° C_________________________ $1.3 \times 10^{10}$
550° C_________________________ $1.3 \times 10^{9}$ The dielectric properties of the material at an elevated temperature are indicated by the following values for Q, obtained as described above.

Values of Q at 450° C.
100 kc_________________________ 74
300 kc_________________________ 116
1000 kc________________________ 173

These characteristics compare quite favorably with those of the ceramic material of Example 1, despite the different raw materials used.

*Example 7*

For the preparation of the ceramic material of this example, 80 parts (54.5 per cent) of a California talc; 20 parts (13.6 percent) of the kaolin of Example 1; and 46.8 parts (31.9 per cent) commercially pure barium carbonate are mixed together. The talc employed has the following composition by weight: 61.1 per cent of $SiO_2$; 31.3 per cent of MgO; 1.7 per cent of $Al_2O_3+Fe_2O_3$; a trace of CaO; and loss on ignition of 4.5 per cent.

The materials are mixed, dewatered, molded and fired according to the procedures indicated in Example 1. A firing temperature of about 1145° C., however, is employed.

The specific resistance of the material at 350° C. determined by the method described above is $1.4 \times 10^{12}$ ohm cm.

Values of Q at 350° C.
100 kc_________________________ 400
300 kc_________________________ 580
800 kc_________________________ 620
3000 kc________________________ 590

The composition of this material calculated as mol per cents of oxides is approximately: 32.5 mol per cent of MgO and 12.5 mol per cent of BaO, a total of 45.0 mol per cent RO; 4.4 mol per cent of $R'_2O_3$ (practically all $Al_2O_3$) and 50.5 mol per cent of $SiO_2$. The composition of this material with its larger proportion of barium oxide is approximately indicated at point $a$ on the triaxial diagram of Fig. 1.

Example 8

In the ceramic material of this example 90 parts (67.5 per cent) of the talc of Example 1; 10 parts (7.5 per cent) of the kaolin of Example 1; 10 parts (7.5 per cent) of chemically pure magnesium carbonate; and 23.4 parts (17.5 per cent) of chemically pure barium carbonate are homogeneously mixed, dewatered, molded and fired to a temperature of about 1190° C. according to the procedure described in Example 1.

The resulting ceramic has a mol per cent composition, calculated as oxides, of approximately 40.8 mol per cent of MgO, 6.0 mol per cent of BaO, and 1.0 mol per cent of CaO, a total of 47.8 mol per cent of RO; 2.5 mol per cent of $Al_2O_3$ and 0.2 mol per cent of $Fe_2O_3$, a total of 2.7 mol per cent of $R_2'O_3$ and 49.5 mol per cent of $SiO_2$. This composition is approximately indicated by point $b$ on the triaxial diagram of Fig. 1. This material is hard, dense, predominantly crystalline in character, and when tested for direct current resistance and dielectric loss at elevated temperatures provides the following data:

Specific resistance in ohm cm.
| | |
|---|---|
| 350° C | $8 \times 10^{11}$ |
| 450° C | $4.5 \times 10^{10}$ |
| 550° C | $4.5 \times 10^9$ |

Values of Q at 450° C.
| | |
|---|---|
| 100 kc | 125 |
| 300 kc | 187 |
| 1000 kc | 238 |

Example 9

Raw materials of the kind described in Example 1 are mixed together in the following proportions by weight: 70 parts (52.5 per cent) of talc; 30 parts (22.5 per cent) of kaolin; 23.4 parts (17.5 per cent) of chemically pure barium carbonate; and 10 parts (7.5 per cent) of chemically pure magnesium carbonate. The ceramic material from these raw materials is formed according to the procedure outlined in Example 1, the firing temperature being about 1270° C.

The resulting material which is dense and predominantly crystalline, although containing a substantial proportion of glass has the following approximate mol per cent composition, calculated as oxides, which is indicated by the point $c$ on the triaxial diagram: 35.2 mol per cent of MgO, 6.5 mol per cent of BaO, and 0.9 mol per cent of CaO, a total of 42.6 mol per cent of RO; 6.6 mol per cent of $Al_2O_3$ and 0.2 mol per cent of $Fe_2O_3$, a total of 6.8 mol per cent of $R'_2O_3$; and 50.6 mol per cent of $SiO_2$. This composition is approximately indicated by point $c$ on the triaxial diagram of Fig. 1.

The following data obtained according to the procedures outlined above indicates the insulation characteristics of the material at elevated temperatures:

Specific resistance in ohm cm.
| | |
|---|---|
| 350° C | $1.2 \times 10^{11}$ |
| 450° C | $9 \times 10^9$ |
| 550° C | $1.2 \times 10^9$ |

Values of Q at 450° C.
| | |
|---|---|
| 100 kc | 42 |
| 300 kc | 71 |
| 1000 kc | 111 |

Example 10

Raw materials of the kind indicated in Example 1 are mixed together in the following proportions: 80 parts (53.6 per cent) of talc; 20 parts (13.4 per cent) of kaolin; 14.8 parts (9.9 per cent) of chemically pure magnesium carbonate and 34.5 parts (23.1 per cent) of chemically pure barium carbonate. After processing and firing to a temperature of about 1205° C. according to the procedure outlined in Example 1 the resulting ceramic material is a dense material which is predominantly crystalline in character although containing a substantial proportion of glass.

Calculated as oxides, its mol per cent composition is approximately 38.3 mol per cent of MgO, 8.6 mol per cent of BaO, and 0.9 mol per cent of CaO, a total of 47.8 mol per cent of RO; 4.2 mol per cent of $Al_2O_3$ and 0.2 mol percent of $Fe_2O_3$, a total of 4.4 mol percent of $R'_2O_3$; and 47.8 mol per cent of $SiO_2$. This composition is approximately indicated on the triaxial diagram of Fig. 1 as point $d$.

Example 11

According to the procedure indicated in Example 1, the following materials in the indicated proportions are formed into a ceramic material: 80 parts by weight (63.3 per cent) of the talc of Example 7; 20 parts by weight (15.8 per cent) of the kaolin of Example 1; 15 parts by weight (11.8 per cent) chemically pure magnesium carbonate; 11.7 parts by weight (9.2 per cent) chemically pure barium carbonate.

The resulting ceramic material, after firing to about 1280° C. is dense, hard and predominantly crystalline in character, although containing a substantial portion of glass. Calculated as oxides, the mol per cent composition of this ceramic material, indicated at about point $a$ on the triaxial diagram, is substantially 41.9 mol per cent MgO and 3.1 mol percent BaO, a total of 45.0 mol per cent RO; 4.4 mol percent $R'_2O_3$ (substantially entirely $Al_2O_3$); and 50.5 mol per cent $SiO_2$.

Resistance and dielectric loss measurements conducted according to the procedure described above indicate that this material has a specific resistance at 350° C. of $5.8 \times 10^{10}$ ohm cm. The dielectric loss characteristics are indicated by the following table:

Values of Q at 350° C.
| | |
|---|---|
| 100 kc | 97 |
| 300 kc | 160 |
| 800 kc | 215 |
| 3000 kc | 265 |

Example 12

A mixture is formed of 80 parts by weight (57 per cent) of the talc of Example 7; 20 parts by weight (14.2 per cent) of the kaolin of Example 1; 5 parts by weight (3.6 per cent) of chemically pure magnesium carbonate; and 35.1 parts by weight (25.0 per cent) of chemically pure barium carbonate. After mixing, dewatering, molding and firing to 1170° C. according to the procedure outlined in Example 1, the ceramic material formed is found to contain a substantial proportion of glass although the material is predominantly crystalline in character.

Calculated as oxides, its mol per cent composition is approximately 35.6 mol per cent MgO and 9.4 mol per cent BaO, a total of 45 per cent RO; 4.4 per cent $R'_2O_3$ (substantially entirely $Al_2O_3$) and 50.5 mol per cent $SiO_2$. This composition is approximately indicated on the triaxial diagram in the drawings by point $a$.

The specific resistance of this material determined according to the procedure indicated above, is about $4 \times 10^{12}$ ohm. cm. at 350° C.

The dielectric loss characteristics determined according to the procedure indicated above are as follows:

| | Values of Q at 350° C. |
|---|---|
| 100 kc | 390 |
| 300 kc | 630 |
| 800 kc | 745 |
| 3000 kc | 750 |

*Example 13*

According to this example, 80 parts by weight (43.5 per cent) of the talc of Example 7; 20 parts by weight (10.9 per cent) of the kaolin of Example 1; 25 parts by weight (13.6 per cent) of chemically pure magnesium carbonate and 58.5 parts by weight (31.8 per cent) commercially pure barium carbonate are mixed together and formed into a ceramic material according to the procedure outlined in Example 1. The maximum firing temperature is about 1205° C.

The resulting ceramic material is predominantly crystalline in character although containing a substantial amount of glass, and has an approximate mol per cent composition, approximately indicated by point e in the triaxial diagram of Fig. 1, calculated as oxides of: 40.4 mol per cent MgO and 13.1 mol per cent of BaO, a total of 53.5 mol per cent of RO; 3.7 mol per cent of $R'_2O_3$ (substantially entirely $Al_2O_3$) and 42.7 mol per cent of $SiO_2$ The material has good resistance to direct currents at elevated temperatures, since its specific resistance at 350° C. is $1.4 \times 10^{12}$ ohm cm. Its dielectric loss characteristics at elevated temperatures determined according to the procedure indicated above are as follows:

| | Values of Q at 350° C. |
|---|---|
| 100 kc | 382 |
| 300 kc | 595 |
| 800 kc | 668 |
| 3000 kc | 808 |

*Example 14*

According to this example a mixture is formed of 80 parts by weight (36.9 per cent) of the talc of Example 7; 20 parts by weight (9.2 per cent) of the kaolin of Example 1; and 117 parts by weight (54 per cent) of chemically pure barium carbonate. The mixture is formed into ceramic material according to the procedure outlined in Example 1, being fired to a maximum temperature of about 1140° C. The final material is dense and predominantly crystalline in character although containing a glassy matrix. Its composition, calculated as mol per cent of oxides and indicated approximately by the point e on the triaxial diagram of Fig. 1 is approximately 27.3 mol per cent of MgO and 26.2 mol per cent of BaO, a total of 53.5 mol per cent of RO; 3.7 mol per cent of $R'_2O_3$ (substantially entirely $Al_2O_3$) and 42.7 mol per cent of $SiO_2$.

The good resistivity of this material to direct currents at elevated temperatures as determined by the method indicated above is indicated by the fact that it has a specific resistance at 350° C. of $3.5 \times 10^{11}$ ohm cm.

Its low dielectric loss characteristics are indicated by the following data, the measurements for which were determined according to the method indicated above:

| | Values of Q at 350° C. |
|---|---|
| 100 kc | 355 |
| 300 kc | 678 |
| 800 kc | 794 |
| 3000 kc | 686 |

*Example 15*

This example illustrates the fact that ceramic material embodying the invention may be made of raw materials including other types of clays than the kaolins, and alkalin earth oxides rather than compounds, such as the carbonates, which on firing will produce oxides. More specifically, in this example a ball clay is employed having the following composition by weight: 51.7 per cent of $SiO_2$; 31.2 per cent of $Al_2O_3$; 1.8 per cent of $TiO_2$; 1.2 per cent of $Fe_2O_3$; .5 per cent of MgO; .2 per cent of CaO, .4 per cent of $K_2O$; .6 per cent of $Na_2O$; and 12.3 per cent ignition loss. A chemically pure calcined magnesium oxide, prepared by calcining magnesium carbonate, is employed.

In preparing the ceramic material, 80 parts by weight (62.4 per cent) of the talc of Example 1, 20 parts by weight (15.6 per cent) of the ball clay, 4.8 parts by weight (3.7 per cent) of chemically pure calcined magnesium oxide, and 23.4 parts by weight (18.3 per cent) of chemically pure barium carbonate, all in finely divided form, are mixed and ground together in a ball mill for about twenty hours, as in Example 1. The resulting slip is then placed in a double motion paddle mixer, a small amount of a suitable plasticizer, such as about 4 per cent of flour, is added and the mass is mixed while heat is applied thereto until it dries into a thick paste. While the paste may be formed into articles in various manners, it may advantageously be extruded, as into rods or tubes.

The resulting ceramic articles are fired according to a procedure similar to that outlined in Example 1, a firing temperature of about 1240° C. being employed. The finished ceramic material has a mol per cent composition similar to that of the material of Example 1, its composition being approximately indicated by point a on the triaxial diagram of Fig. 1. Its electrical characteristics are very nearly the same as those of the material of Example 1, although slightly inferior because of the presence of a small amount of alkalis resulting from alkali impurities in the ball clay.

The material is a hard, dense, strong, cream-colored solid, which is predominantly crystalline in character although it contains a substantial amount of glass. Although non-porous, the material has a rough surface, due to the employment of calcined magnesium oxide as a raw material, which is advantageous for certain purposes. As an example, the rough surface of the material causes coatings firmly to adhere to the material, wherefore the material may be advantageously employed in carbon resistors of the type in which carbon is deposited on a base of insulating material.

*Example 16*

The employment of a calcium oxide in a ceramic material in combination with another alkalin earth oxide is indicated by this example, in which 80 parts by weight (64.6 per cent) of the talc of Example 7, 20 parts by weight (16.2 per cent) of the kaolin of Example 1, and 23.7 parts by weight (19.2 per cent) of chemically pure calcium carbonate are mixed together.

These materials are processed in the manner outlined in Example 1 to form a fired ceramic material, a maturing temperature in the neighborhood of 1230° C. being employed. The resulting material is dense and strong and although it contains an appreciable amount of glass is predominantly crystalline in character. Its mol per cent composition calculated as oxides, and indicated approximately by the point $a$ on the triaxial diagram in the drawings is approximately 32.5 mol per cent MgO and 12.5 mol per cent CaO, a total of 45.0 mol per cent RO; 4.4 mol per cent of $R'_2O_3$ (substantially entirely $Al_2O_3$); and 50.5 mol per cent of $SiO_2$.

This material has a specific resistance at 350° C. of approximately $4.4 \times 10^{10}$ ohm cm. as determined according to the method indicated above.

Its dielectric properties are indicated by the following table, the data for which was determined according to the procedure mentioned above.

| | Values of Q at 355° C. |
|---|---|
| 100 kc | 46 |
| 300 kc | 85 |
| 800 kc | 133 |
| 3000 kc | 230 |

Example 17

The ceramic material prepared according to this example contains strontium oxide as well as another alkalin earth oxide, and is formed of 80 parts by weight (59.2 per cent) of the talc of Example 7; 14.8 per cent of the kaolin of Example 1, and 35 parts by weight (25.9 per cent) of chemically pure strontium carbonate. After mixing, molding and firing according to a procedure similar to that outlined in Example 1, in which procedure, however, the firing temperature is about 1150° C., a ceramic material is obtained which is predominantly crystalline in character although containing a substantial proportion of glass. Its mol per cent composition calculated as oxides and indicated approximately by point $a$ on the triaxial diagram of Fig. 1 is approximately 32.5 mol per cent MgO and 12.5 mol per cent SrO, a total of 45.0 mol per cent RO; 4.5 mol per cent $R'_2O_3$ (substantially entirely $Al_2O_3$); and 50.5 mol per cent $SiO_2$.

The direct current resistance characteristics of this material at elevated temperatures is indicated by the fact that at 350° C. it has a specific resistance of about $1.8 \times 10^{10}$ ohm cm., as determined by the method indicated above.

The following data determined by the method indicated above indicates the dielectric properties of this material at elevated temperatures:

| | Values of Q at 355° C. |
|---|---|
| 100 kc | 41 |
| 300 kc | 83 |
| 800 kc | 130 |
| 3000 kc | 226 |

Example 18

This example illustrates a ceramic material embodying the present invention comprising beryllium oxide and another alkaline earth metal oxide. To prepare this material, 80 parts by weight (75.5 per cent) of the talc of Example 7, 20 parts by weight (18.9 per cent) of the kaolin of Example 1, and 5.93 parts by weight (5.6 per cent) of chemically pure beryllium oxide are mixed together and formed into a ceramic material, Example 1, a maturing temperature of about 1255° C. being employed.

The resulting material is predominantly crystalline although it contains a substantial portion of glass, and has an approximate mol per cent composition calculated as oxides of the following: 32.5 mol per cent of MgO and 12.5 mol per cent of BeO, a total of 45.0 mol per cent of RO; 4.4 mol per cent $R'_2O_3$ (substantially entirely $Al_2O_3$) and 50.5 mol per cent of $SiO_2$. This corresponds approximately to point $a$ on the triaxial diagram of Fig. 1.

This material has a specific resistance at 350° C. of about $1.1 \times 10^{12}$ ohm cm., as determined by the method indicated above.

The dielectric properties of the material at elevated temperatures are indicated by the following data, obtained as indicated above:

| | Values of Q at 355° C. |
|---|---|
| 100 kc | 7.6 |
| 300 kc | 9.3 |
| 800 kc | 11.0 |
| 3000 kc | 15.0 |

Example 19

This example illustrates a ceramic material comprising three alkalin earth oxides. To form it, 80 parts by weight (67 per cent) of the talc of Example 7; 20 parts by weight (16.7 per cent) of the kaolin of Example 1, 3.92 parts by weight (3.3 per cent) of commercially pure beryllium oxide and 15.6 parts by weight (13.0 per cent) of barium carbonate are mixed together and processed to form a ceramic according to the procedure indicated in Example 1. In producing the ceramic of the present example, a maximum temperature of about 1195° C. is employed.

After firing, the resulting material contains a substantial portion of glass but is predominantly crystalline in structure. Its mol per cent composition, calculated as oxides and indicated approximately by point $a$ on the triaxial diagram in the drawing is approximately as follows: 32.5 mol per cent of MgO, 8.3 mol per cent of BeO, and 4.2 mol per cent of BaO, a total of 45 per cent RO, 4.4 mol per cent of $R'_2O_3$ (substantially entirely $Al_2O_3$) and 50.5 mol per cent of $SiO_2$.

The specific resistance of this material at 350° C. is about $1.6 \times 10^{11}$ ohm cm. determined according to the method indicated above. The dielectric properties are indicated by the following data also determined according to the method indicated above:

| | Values of Q at 350° C. |
|---|---|
| 100 kc | 138 |
| 300 kc | 256 |
| 800 kc | 330 |
| 3000 kc | 485 |

Example 20

The ceramic material of this example is one having three alkalin earth oxides: MgO, BaO and SrO. It is prepared by mixing together 80 parts by weight (56.8 per cent) of the talc of Example 1, 20 parts by weight (14.2 per cent) of the kaolin of Example 1, 23.4 parts by weight (16.6 per cent) of chemically pure barium carbonate and 17.5 parts by weight (12.4 per cent) chemically pure strontium carbonate. The materials are mixed, dewatered, molded and fired in accordance with the procedure described in Example 1, the firing temperature employed being about 1110° C. The resulting ceramic material which contains a substantial amount of glass but is predominantly position, calculated as oxides, of approximately 32.1 mol per cent of MgO, 6.1 mol per cent of BaO, 6.1 mol per cent of SrO, and .9 mol per cent of CaO, a total of 45.2 mol per cent RO, 4.5 mol per cent of $Al_2O_3$ and 0.3 mol per cent of $Fe_2O_3$, a total of 4.8 mol per cent of $R'_2O_3$, and 50.0 mol per cent of $SiO_2$, the composition of this material being indicated approximately by point $a$ on the triaxial diagram constituting Fig. 1 of the drawings.

The specific resistance of this material, determined according to the procedure indicated above, at 350° C. is about $4 \times 10^{12}$ ohm cm. and 450° C. is about $1 \times 10^{11}$ ohm cm. At 550° C. the material polarizes and hence does not have satisfactory alternating current insulation characteristics, although it does have good characteristics at lower temperatures.

The dielectric characteristics of this material, determined according to the procedure indicated above, is indicated by the following data:

Values of Q at 450° C.
100 kc ______________________________ 191
300 kc ______________________________ 239
1000 kc _____________________________ 283

*Example 21*

This example indicates that other materials besides the typical clays may be employed and that in some cases it is advantageous to substitute boron oxide for a portion of the aluminum oxide. In this case 90 parts by weight (71 per cent) the talc of Example 1, 10 parts by weight (7.9 per cent) of "dumortierite," 3.5 parts by weight (2.8 per cent) of chemically pure magnesium carbonate and 23.4 parts by weight (18.5 per cent) of commercially pure barium carbonate are mixed together, dewatered, molded and fired to a temperature of approximately 1205° C. according to the procedure indicated in Example 2.

The dumortierite employed has the theoretical formula $8Al_2O_3$—$B_2O_3$—$6SiO_2$—$H_2O$, and a theoretical composition by weight of 28.5 per cent $SiO_2$, 64.5 per cent $Al_2O_3$, 5.5 per cent $B_2O_3$, no alkalis, and 1.4 per cent loss on ignition.

The finished ceramic material is predominantly crystalline in structure but has a substantial portion of glass therein. It is dense, quite strong, and has an approximate mol per cent composition, calculated as oxides, of 38.3 mol per cent MgO, 1.0 mol per cent of CaO, and 6.2 mol per cent of BaO, a total of 45.5 mol per cent of RO; 4.0 mol per cent of $Al_2O_3$, .2 mol per cent of $Fe_2O_3$ and .5 mol per cent of $B_2O_3$, a total of 4.7 mol per cent of $R'_2O_3$, and 49.8 mol per cent of $SiO_2$. Its composition is approximately indicated on the triaxial diagram of Fig. 1 of the drawings by the point $a$.

Its direct current resistance properties are indicated by the following data, obtained by measurements performed according to the procedure indicated above:

Specific resistance in ohm cm.
350° C _______________________ $1.6 \times 10^{12}$
450° C _______________________ $9 \times 10^{10}$
550° C _______________________ $8 \times 10^{9}$ Its dielectric properties are indicated by the following data, determined according to the method indicated above:

Values of Q at 450° C.
100 kc ______________________________ 210
300 kc ______________________________ 299
1000 kc _____________________________ 322

As is evident from the data given in the examples the specific resistances of the ceramic material of the present invention, although high even at elevated temperatures, increase as the temperature is decreased. Therefore, at lower or room temperatures the specific resistance of each of the ceramic materials of the invention indicated in the examples is higher than its specific resistance at elevated temperatures, wherefore it has not been deemed necessary to indicate the specific resistances at room temperature of the illustrative materials.

For similar reasons no figures have been given indicating the dielectric properties of the materials of the examples at lower or room temperatures, since in each case the dielectric loss is less and the values of Q greater at lower or room temperatures than at the elevated temperatures indicated in the examples. This is illustrated by Example 1, which indicates that the values for Q at 350° C. are higher than the values for Q at corresponding frequencies at 450° C.

When the ceramic material having a mol per cent composition of the nature contemplated by the present invention is formed of raw materials comprising talc and clay, such as kaolin, or similar materials, and two alkalin earth oxides or alkalin earth compounds which upon firing are reduced to oxides, a critical composition apparently occurs for each talc-kaolin ratio when the alkalin earth oxides or compounds of the alkalin earths employed as raw materials are added in such amounts that the alkalin earth oxides added or the alkalin earth oxides resulting from added oxide producing compounds are in substantially equimolecular amounts. Such composition embodying approximately equimolecular amounts of added alkalin earth oxides possesses better direct current resistance and dielectric loss properties than compositions in which the added alkalin earth oxides or oxide producing compounds are employed in non-equimolecular quantities. This is particularly true when the added oxides are magnesium oxide and barium oxide or when magnesium and barium compounds are employed which result in such oxides upon firing, since in such case exceptionally good dielectric properties and direct current resistances are obtained. The effect of equimolecular quantities of alkalin earth oxide additions is illustrated by the following data:

A ceramic material prepared according to the procedure indicated in Example 1 from 80 parts of talc, 20 parts of kaolin and 20 parts of magnesium carbonate has a specific resistance at 350° C. determined as indicated hereinbefore of approximately $6.3 \times 10^{9}$ ohm cm., and values of Q at 350° C. determined as indicated hereinbefore of approximately 36 at 100 kilocycles, 54 at 300 kilocycles, 89 at 800 kilocycles and 125 at 3000 kilocycles. One-quarter of the magnesium carbonate in this hypothetical ceramic material is replaced by an equimolecular amount of barium carbonate in preparing the ceramic material of Example 11; one-half of the magnesium carbonate is replaced by an equimolecular quantity of barium carbonate in preparing the ceramic material of Example 1; three-quarters of the magnesium carbonate is replaced by an equimolecular quantity of barium carbonate in preparing the ceramic material of Example 12; and all of the magnesium carbonate is replaced by an equimolecular quantity of barium carbonate in preparing the ceramic material of Example 7. As a comparison of the values for Q of the ceramic materials of this series will indicate, the values for Q are highest, and hence the dielectric losses lowest for the ceramic material of Example 1 in which magnesium and barium carbonate are added in equimolecular quantities. A comparison of the values for specific resistances of this series of ceramic materials indicates that the specific resistance also reaches a maximum at or near a composition in which equimolecular amounts of alkalin earth oxides are present. Indeed, when the same kinds of talc and other ingredients are employed in each material of such a series, in contrast to the series described above in which different talcs are employed, it is found that the material having equimolecular quantities of alkalin earth oxide has the highest resistance of any material of such series.

As another illustration, a ceramic material prepared according to the procedure indicated in Example 1 from 80 parts of talc, 20 parts of kaolin, and 50 parts of magnesium carbonate has a specific resistance at 350° C., determined as above, of approximately $5.2 \times 10^{10}$ ohm cm. and values of Q at 350° C., determined as above, of approximately 42 at 100 kilocycles, 61 at 30 kilocycles, 80 at 800 kilocycles, and 108 at 3000 kilocycles. One-half of the magnesium carbonate in this ceramic material is replaced by an equimolecular quantity of barium carbonate in preparing the ceramic material of Example 13; and all of the magnesium carbonate is replaced by barium carbonate in preparing the ceramic material of Example 14. A comparison of the values of Q and the values of the specific resistances of the ceramic materials of this series indicates that the values for Q are highest, and hence the dielectric losses are lowest, and that the values for the specific resistance are highest, for the ceramic material of Example 13, in which the magnesium carbonate and barium carbonate are present in equimolecular amounts.

Ceramic material having a composition represented by a point in the area bounded by the lines in the $SiO_2$, RO, $R'_2O_3$ mol per cent diagram of Fig. 1 formed of raw materials comprising talc and kaolin or similar materials and two alkalin earth oxides or alkalin earth compounds which on firing produce the oxides apparently has exceptionally desirable characteristics when such alkalin earth oxides or compounds are added in amounts resulting in equimolecular quantities of the added oxides.

A comparison of the most desirable ceramic material from the electrical insulation standpoint indicated in the examples and represented by point $a$ on the triaxial diagram, the ceramic material of Example 1, with the most desirable ceramic material having a composition corresponding to point $e$, that of Example 13, indicates that the ceramic materials having approximately the composition of point $a$ are better than corresponding ceramic materials having approximately the composition of point $e$. Similar comparisons could be made between point $a$ and other points in the bounded area on the triaxial diagram indicating that ceramic materials having approximately the mol per cent composition of point $a$, that is, approximately 50 mol per cent of $SiO_2$, 5 mol per cent of $R'_2O_3$, and 45 mol per cent of RO, in general, have better characteristics than those of materials having other compositions within the ranges contemplated by the invention. Such a composition in which RO is made up of about 39 mol per cent of MgO and about 6 mol per cent of BaO is particularly desirable; that is, a composition corresponding to one in which talc, kaolin and equimolecular amounts of magnetism oxide and barium oxide or oxide-producing compounds of such metals are employed as raw materials. As indicated above, a steatite type ceramic material having equimolecular amounts of magnesium and barium oxide additions possesses exceptionally good direct current resistance and dielectric loss characteristics.

Other constituents may be employed in ceramic materials which otherwise have the compositions contemplated by the present invention and it is intended that such ceramic materials be included within the scope of the present invention.

Figure 2:
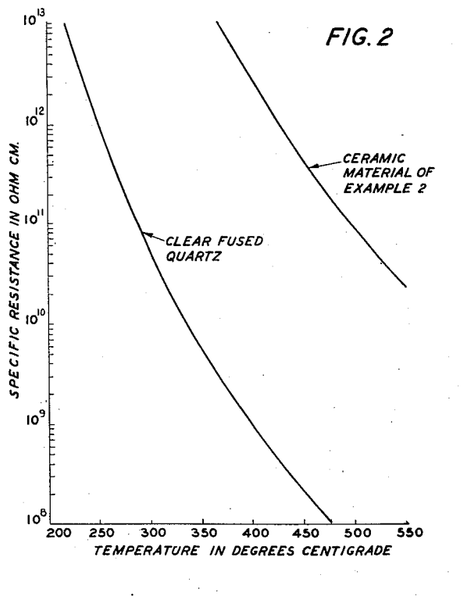
Fig. 2 is a graph showing a comparison of the direct current resistance characteristics at elevated temperatures of a ceramic material embodying the present invention with those of clear fused quartz.
Figure 3:
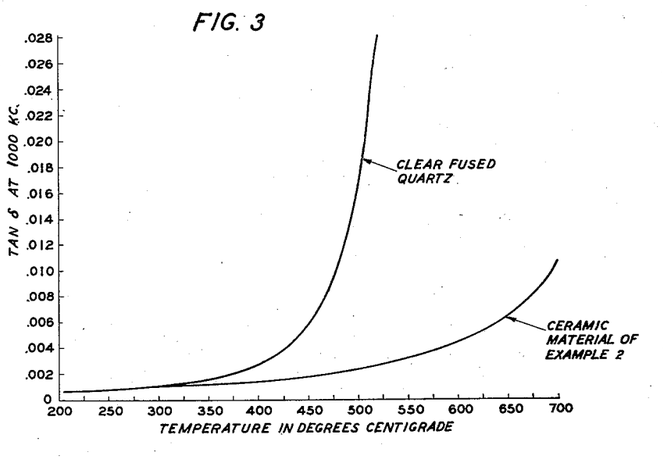
Fig. 3 is a graph showing a comparison of the dielectric loss characteristics at 1000 kilocycles and at elevated temperatures of a ceramic material embodying the present invention with those of clear fused quartz.

The excellent resistance and dielectric properties which may be obtained with ceramic materials embodying the present invention are indicated by the curves of Figs. 2 and 3.

Fig. 2 graphically illustrates a comparison of the specific resistance temperature relationship for the ceramic material of Example 2, which is one of the preferred embodiments of the invention with that of clear fused quartz, hitherto commonly considered one of the best insulating materials. The data for these curves, which represent the specific resistances in ohm centimeters plotted as functions of temperature in degrees centigrade, are obtained by measurements on discs of the materials of the size indicated above according to the method indicated above. These curves indicate that at elevated temperatures the ceramic material of the present invention produced according to the conditions outlined in Example 2 has a direct current resistance over 1000 times as great as that of clear fused quartz, and that this great difference increases as the temperature is increased.

Fig. 3 graphically illustrates a comparison of the temperature-dielectric loss characteristics of the ceramic material produced according to Example 2 with like characteristics of clear fused quartz. The curves represent the values for the loss angle, tangent $\delta$, of the materials at 1000 kilocycles plotted against temperature in degrees centigrade, tangent $\delta$ being proportional to the dielectric loss and being determined by measurements according to the procedure indicated above on discs of the materials which are identical as to size. As the curves indicate, the ceramic material of the present invention is at least equivalent in dielectric characteristics to fused quartz at lower temperatures. At elevated temperatures the dielectric loss in clear fused quartz commences to increase rapidly at about 400° C., while that of the ceramic material of the present invention increases gradually to much higher temperatures, no considerable rate of increase occurring until a temperature of about 650° C.

Consequently it is clear that according to the present invention ceramic materials may be produced having direct current resistance properties and dielectric loss properties considerably better at elevated temperatures than those of fused quartz and, so far as is known, better than any other materials of this type. The ceramic material produced according to Example 2 is, as has been indicated, very similar in composition to that of Example 1 which is likewise one of the preferred materials of the present invention.

Figure 4:
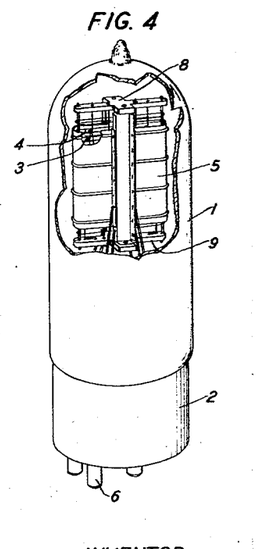
Fig. 4 represents a vacuum tube, parts being broken away to show the insulators which may be formed of ceramic material embodying the present invention.

Because of the high resistance and low dielectric loss characteristics, even at elevated temperatures and with high frequency currents, which may be obtained with ceramic material embodying the present invention, such material may be very advantageously employed, as indicated above, as insulators for supporting the elements of vacuum tubes. Fig. 4 illustrates a typical vacuum tube, comprising an evacuated or gas-filled glass envelope 1 supported by socket 2. Elements such as filament 3, grid 4, and plate 5 contained within the glass envelope 1 are connected to the corresponding contacting members 6 carried by the socket 2, and are supported and positioned by insulators 8 and 9. Such insulators are subjected to high frequency currents and heavy direct currents passing to and between the elements, and to high temperatures, particularly in high power tubes. Such insulators may be very advantageously formed of the ceramic materials of the present invention because of desirable characteristics of such materials.

Although ceramic materials of the present invention have been primarily discussed as useful for vacuum tube insulators, it is obvious that materials embodying the invention may be employed for other purposes. Thus, since they have even better direct current resistance properties and high frequency current dielectric loss properties at low temperatures than at elevated temperatures, it is apparent that they may be employed to good advantage for low temperature electrical insulation apparatus. Their heat resistant properties render them useful for various high temperature uses. The ceramic materials embodying the invention may also be advantageously employed for nonelectrical purposes.

Various modifications may be made in the methods discussed above in preparing the ceramic materials of the present invention, and various other methods of preparing such materials may be employed without departing from the spirit of the invention. Similarly other raw materials than those indicated may be employed for producing the ceramic materials of the invention.

In the appended claims the term "oxides" as employed in describing the raw or starting materials from which the ceramic material of the invention is made is intended to include, besides the oxides themselves, compounds which upon firing, would result in the oxides.

It is intended that the patent shall cover by suitable expression in the appended claims whatever features of novelty reside in the invention.

What is claimed is:

1. A strong fired ceramic material comprising small crystals constituting the major proportion of the structure of the material, and glass constituting a substantial proportion of the structure of the material cementing together said crystals in the material, said ceramic material being essentially formed of constituents which calculated as oxides form a composition falling within the parallelogram-shaped area on an mol per cent triaxial diagram approximately bounded by the parallel lines indicating 2 and 8 mol per cent of $R'_2O_3$ and the parallel lines indicating 40 and 52 mol per cent of $SiO_2$, in which diagram $R'_2O_3$ represents an oxide chosen from the group consisting of $Al_2O_3$ and $Al_2O_3$ plus $B_2O_3$, and RO represents at least about 25 mol per cent of the ceramic material of MgO and at least one alkalin earth oxide other than MgO in an amount at least as great as about 2 mol per cent of the ceramic material, which ceramic material contains no more than a small amount of alkali metal oxide.

2. A ceramic material of the character described in claim 1 which contains no more than about 0.5 per cent by weight of alkali metal oxide.

3. A ceramic material of the character described in claim 1 formed of raw materials comprising essentially talc, a non-swelling clay, and at least one alkalin earth oxide other than magnesium oxide.

4. A ceramic material of the character described in claim 1 in which the crystals are essentially meso-enstatite.

5. A ceramic material of the character described in claim 1 formed of raw materials at least some of which are calcined, whereby the finished ceramic material has a rough surface.

6. A ceramic material of the character described in claim 1 in which the glass constitutes from about 15 per cent to about 45 per cent by volume of the ceramic material.

7. A strong fired ceramic material comprising small crystals constituting a substantial proportion of the structure of the material, and glass constituting a substantial proportion of the structure of the material cementing together said crystals in the material, said ceramic material being essentially formed of constituents which calculated as oxides form a composition falling within the parallelogram-shaped area on an $SiO_2$—$R'_2O_3$—RO mol per cent triaxial diagram approximately bounded by the parallel lines indicating 2 and 8 mol per cent of $R'_2O_3$ and the parallel lines indicating 40 and 52 mol per cent of $SiO_2$, in which diagram $R'_2O_3$ represents an oxide chosen from the group consisting of $Al_2O_3$ and $Al_2O_3$ plus $B_2O_3$, and RO represents at least about 25 mol per cent of the ceramic material of MgO and at least one alkalin earth oxide other than MgO in an amount at least as great as about 2 mol per cent of the ceramic material, which ceramic material contains no more than a small amount of alkali metal oxide.

8. A strong fired ceramic material comprising small crystals constituting the major proportion of the structure of the material, and glass constituting a substantial proportion of the structure of the material cementing together said crystals in the material, said ceramic material being formed of constituents which calculated as oxides essentially comprise about 50 mol per cent of silicon dioxide, about 39 mol per cent of magnesium oxide, about 6 mol per cent of barium oxide, and about 5 mol per cent of aluminum oxide, said ceramic material containing no more than a small amount of alkali metal oxide.

9. A strong fired ceramic material comprising small crystals constituting the major proportion of the structure of the material, and glass constituting a substantial proportion of the structure of the material cementing together said crystals in the material, said ceramic material being formed of raw materials containing no more than a small amount of alkali metal compound essentially comprising by weight about 60 per cent of talc, 15 per cent of kaolin, 7.5 per cent of magnesium carbonate, and 17.5 per cent of barium carbonate.

10. A strong fired ceramic material comprising small crystals constituting the major proportion of the structure of the material, and glass constituting a substantial proportion of the structure of the material cementing together said crystals in the material, said ceramic material being formed of constituents which calculated as oxides essentially comprise about 50 mol per cent of silicon dioxide, about 32.5 mol per cent of magnesium oxide, about 12.5 mol per cent of strontium oxide, and about 5 mol per cent of aluminum oxide, said ceramic material containing no more than a small amount of alkali metal oxide.

11. A strong fired ceramic material comprising small crystals constituting the major proportion of the structure of the material, and glass constituting a substantial proportion of the structure of the material cementing together said crystals in the material, said ceramic material being formed of raw materials containing no more than a small amount of alkali metal compounds which essentially comprise talc, clay and equimolecular proportions of two alkalin earth oxides, and which raw materials are combined in such proportions that the constituents of said ceramic material calculated as oxides fall within the parallelogram-shaped area on an mol per cent triaxial diagram approximately bounded by the parallel lines indicating 2 and 8 mol per cent of $R'_2O_3$ and the parallel lines indicating 40 and 52 mol per cent of $SiO_2$, in which diagram $R'_2O_3$ represents an oxide chosen from the group consisting of $Al_2O_3$ and $Al_2O_3$ plus $B_2O_3$, and RO represents a plurality of alkalin earth oxdes.

12. A ceramic material of the character described in claim 11 in which the two alkalin earth oxides employed in equimolecular proportions are magnesium oxide and barium oxide.

13. A strong fired ceramic material comprising small crystals constituting the major proportion of the structure of the material, and glass constituting a substantial proportion of the structure of the material cementing together said crystals in the material, said ceramic material being formed of raw materials containing no more than a small amount of alkali metal compounds which essentially comprise talc, clay and equimolecular proportions of two alkalin earth oxides, and which raw materials are combined in such proportions that the constituents of said ceramic material calculated as oxides comprise about 50 mol per cent of silicon dioxide, about 5 mol per cent of aluminum oxide, and about 45 mol per cent of alkalin earth oxides.

14. A strong fired ceramic material comprising small crystals constituting the major proportion of the structure of the material, and glass constituting a substantial proportion of the structure of the material cementing together said crystals in the material, said ceramic material being formed of raw materials containing no more than a small amount of alkali metal compounds which essentially comprise talc, clay and equimolecular proportions of magnesium oxide and barium oxide, and which raw materials are combined in such proportions that the constituents of said ceramic material calculated as oxides comprise about 50 mol per cent of silicon dioxide, about 5 mol per cent of aluminum oxide, and about 45 mol per cent of alkalin earth oxides including magnesium oxide and barium oxide.

15. A strong fired ceramic material comprising small crystals constituting the major proportion of the structure of the material, and glass constituting a substantial proportion of the structure of the material cementing together said crystals in the material, said ceramic material being formed of constituents which calculated as oxides essentially comprise about 50 mol per cent of silicon dioxide, about 5 mol per cent of aluminum oxide, and about 45 mol per cent of a mixture of at least two alkalin earth oxides.

16. A strong fired ceramic material comprising small crystals constituting the major proportion of the structure of the material, and glass constituting a substantial proportion of the structure of the material cementing together said crystals in the material, said ceramic material being formed of constituents which calculated as oxides essentially comprise about 50 mol per cent of silicon dioxide, about 5 mol per cent of aluminum oxide, and about 45 mol per cent of a mixture of alkalin earth oxides including magnesium oxide and barium oxide.

17. An electric insulator having a high direct current resistance and low dielectric losses at high frequencies formed of a strong fired ceramic material comprising small crystals constituting the major proportion of the structure of the material, and glass constituting a substantial proportion of the structure of the material cementing together said crystals in the material, said ceramic material being essentially formed of constituents which calculated as oxides form a composition falling within the parallelogram-shaped area on an $SiO_2$—$R'_2O_3$—RO mol per cent triaxial diagram approximately bounded by the parallel lines indicating 2 and 8 mol per cent of $R'_2O_3$ and the parallel lines indicating 40 and 52 mol per cent of $SiO_2$, in which diagram $R'_2O_3$ represents an oxide chosen from the group consisting of $Al_2O_3$ and $Al_2O_3$ plus $B_2O_3$, and RO represents at least about 25 mol per cent of the ceramic material of MgO and at least one alkalin earth oxide other than the MgO in an amount at least as great as about 2 mol per cent of the ceramic material, which ceramic material contains no more than a small amount of alkali metal oxide.

18. The method of forming a strong ceramic material formed of small crystals constituting the major proportion of the structure of the material and of glass constituting a substantial proportion of the structure of the material cementing together said crystals in the material, comprising intimately mixing finely divided talc, clay and equimolecular proportions of two alkalin earth oxides in proportions such that the sum of the constituents of said materials calculated as oxides fall within the parallelogram-shaped area of an $SiO_2$—$R'_2O_3$—RO mol per cent triaxial diagram approximately bounded by the parallel lines indicating 2 and 8 mol per cents of $R'_2O_3$ and by the parallel lines indicating 40 and 52 mol per cents of $SiO_2$ in which diagram $R'_2O_3$ represents essentially aluminum oxide and RO represents at least 25 mol per cent of magnesium oxide and at least 2 mol per cent of a different alkalin earth oxide, and firing the mixture of said materials to a temperature and thereafter cooling the fired ceramic at a rate such that a substantial proportion of glass is formed.

19. The method of forming a ceramic material formed of small crystals constituting the major proportion of the structure of the material and of glass constituting a substantial proportion of the structure of the material cementing together said crystals in the material, comprising intimately mixing finely divided talc, clay and at least one alkalin earth oxide other than magnesium oxide in proportions such that the sum of the constituents of said materials, calculated as oxides, fall within the parallelogram-shaped area on an $SiO_2$—$R'_2O_3$—$RO$ mol per cent triaxial diagram approximately bounded by the parallel lines indicating 2 and 8 mol per cents of $R'_2O_3$ and by the parallel lines indicating 40 and 52 mol per cents of $SiO_2$, in which diagram $R'_2O_3$ represents essentially aluminum oxide and $RO$ represents at least 25 mol per cent of magnesium oxide and at least 2 mol per cent of said alkalin earth oxide, and firing the mixture of said materials to a temperature and thereafter cooling the fired ceramic material at a rate such that a substantial proportion of glass is formed.

MERLE D. RIGTERINK.